United States Patent
Kosack et al.

(10) Patent No.: US 7,309,520 B2
(45) Date of Patent: Dec. 18, 2007

(54) FLAT PACKING AND METHOD FOR THE PRODUCTION THEREOF

(75) Inventors: Steffen Kosack, Hassloch (DE);
Thomas Klenk, Eppelheim (DE);
Ulrich Liedtke, Laudenbach (DE);
Frank Schultz, Mannheim (DE)

(73) Assignee: Carl Freudenberg KG (DE)

( * ) Notice: Subject to any disclaimer, the term of this patent is extended or adjusted under 35 U.S.C. 154(b) by 331 days.

(21) Appl. No.: 10/480,204

(22) PCT Filed: Feb. 26, 2002

(86) PCT No.: PCT/EP02/02018

§ 371 (c)(1),
(2), (4) Date: Jul. 19, 2004

(87) PCT Pub. No.: WO02/101267

PCT Pub. Date: Dec. 19, 2002

(65) Prior Publication Data

US 2004/0239046 A1      Dec. 2, 2004

(30) Foreign Application Priority Data

Jun. 13, 2001   (DE) .................................. 101 28 346

(51) Int. Cl.
*A01K 1/015* (2006.01)
*F16J 15/20* (2006.01)
(52) U.S. Cl. .................... 428/221; 277/536; 442/164; 442/97
(58) Field of Classification Search ................ 428/221, 428/420, 421; 442/164, 97, 98, 101; 277/536, 277/539
See application file for complete search history.

(56) References Cited

U.S. PATENT DOCUMENTS

| | | | | |
|---|---|---|---|---|
| 3,646,846 A | * | 3/1972 | Houghton et al. | 87/1 |
| 4,042,747 A | * | 8/1977 | Breton et al. | 428/323 |
| 4,256,806 A | * | 3/1981 | Snyder | 428/378 |
| 5,306,553 A | * | 4/1994 | Spillner et al. | 442/97 |
| 5,709,944 A | * | 1/1998 | Kokumai et al. | 428/402 |
| 5,879,789 A | * | 3/1999 | Dolan et al. | 428/212 |
| 6,030,694 A | * | 2/2000 | Dolan et al. | 428/212 |
| 6,905,985 B1 | * | 6/2005 | Schindzielorz et al. | 442/65 |
| 7,015,159 B2 | * | 3/2006 | Auza et al. | 442/415 |

FOREIGN PATENT DOCUMENTS

| | | |
|---|---|---|
| DE | 140 019 A | 2/1980 |
| FR | 1 495 195 A | 12/1967 |
| JP | 58 028056 A | 2/1983 |
| JP | 60 240436 A | 11/1985 |
| WO | WO 92/18578 A | 10/1992 |

OTHER PUBLICATIONS

International Search Report for PCT/EP02/02018; ISA/EPO; Date of Mailing: Jul. 16, 2002.

* cited by examiner

*Primary Examiner*—N. Edwards
(74) *Attorney, Agent, or Firm*—Harness, Dickey & Pierce, P.L.C.

(57) ABSTRACT

A flat gasket made up of at least one layer of nonwoven fabric consisting of a sheet of asbestos-free fibers or fiber mixtures and impregnated with a polymer, the sealing element consisting of at least one polytetrafluoroethylene-impregnated nonwoven fabric.

11 Claims, 1 Drawing Sheet

FLAT PACKING AND METHOD FOR THE PRODUCTION THEREOF

CROSS-REFERENCE TO-RELATED APPLICATIONS

This application is a National Stage of International Application No. PCT/EP02/02018, filed Feb. 26, 2002. This application claims the benefit of German Patent Application 10128346.6, filed Jun. 13, 2001. The disclosure of the above applications are incorporated herein by reference.

FIELD OF THE INVENTION

The invention relates to a flat gasket, the sealing element of which is a nonwoven fabric impregnated with an active agent, particularly polytetrafluoroethylene (PTFE), and to a process for making such a gasket.

BACKGROUND OF THE INVENTION

In the (petro)chemical industry or in energy-producing and processing plants, flat gaskets made of rubber-bonded materials and of pressed sheets or pressed films of flexible graphite are often used for flanged joints. The fillers in such cases are mostly fibrous materials, mineral additives, graphite, charcoal, metal or metallic inserts, or appropriate combinations thereof. The fibrous materials can also be specially impregnated.

PTFE has found wide use in flat gaskets requiring very high chemical resistance combined with good sealing and mechanical properties of the gasket material at high temperatures.

It is known from DE-A 44 19 007 to create flat gaskets made of at least one nonwoven fabric prepreg in which a sheeting made of asbestos-free fibers or fiber blends is impregnated with a pre-crosslinkable solution, dispersion or suspension of a reactive polymer mixture, then pre-crosslinked by drying at an elevated temperature and optionally laminated to a plastic or metal film.

Document EP-B 654 625 discloses flat gaskets consisting of microporous, stretched PTFE that are provided at least in part with a solvent-resistant polymeric lacquer.

Document U.S. Pat. No. 5,997,008 describes a sealing ring consisting of a corrugated metallic ring which, at least on one side, is provided with a nonmetallic coating exhibiting a low coefficient of friction, for example with a PTFE coating, and acting as a microsealing layer.

SUMMARY OF THE INVENTION

The object of the invention is to provide a flat gasket exhibiting high sealing ability in combination with unusually good mechanical and heat characteristics and optimum chemical resistance.

To this end, the starting point for producing such gaskets are mechanically bonded nonwoven fabrics with an irregular or random fibrous structure. Of particular importance is the fact that the nonwoven fabric is predominantly mechanically bonded, because the material used for chemical bonding can, during subsequent use, volatilize at high temperatures which would result in insufficient coherence or would, for example during subsequent use as a gasket in pipeline systems of the chemical industry, result in insufficient chemical resistance. The good mechanical supporting action and the openness and porosity are based on the length of the fibers that are preferably in the range from 3 to 20 mm. The weight per unit is about 20 to 500 g/m$^2$. The shortness of the fibers generates high porosity that is advantageous for the subsequent impregnation.

Predominantly used because of its good heat and chemical resistance and outstanding mechanical strength are mechanically bonded nonwoven aramide fabrics. Nonwoven fabric, however, made of others fibers and fiber blends, for example of polyimide (PI), polybenzimidazole (PBI), polyester (PES), glass fibers (GF), aramide fibers (AF) or basalt fibers can also be used, depending on the intended application. The bonding of the nonwoven fabric is done mechanically, for example, by water-jet bonding or needling. Mechanical bonding is important because, in contrast to chemical bonding, it produces high stability even at high temperatures. The nonwoven fabric web itself has a thickness of 5 mm or less and preferably from 1 to 2.5 mm.

The great advantage of nonwoven fabric impregnation compared to, for example, the known impregnation of woven fabrics lies in the fact that in nonwoven fabrics, compared to woven fabrics in which the fibers are bunched together, the fibers are separated from each other and well distributed so that each fiber is enveloped by the impregnant. In woven fabrics or braided webs, on the other hand, impregnation takes place only externally, resulting in substantially less effective sealing and particularly in less effective gas tightness.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWING

The present invention will become more fully understood from the detailed description and the accompanying drawing, wherein.

DETAILED DESCRIPTION OF THE PREFERRED EMBODIMENTS

Figure 1:
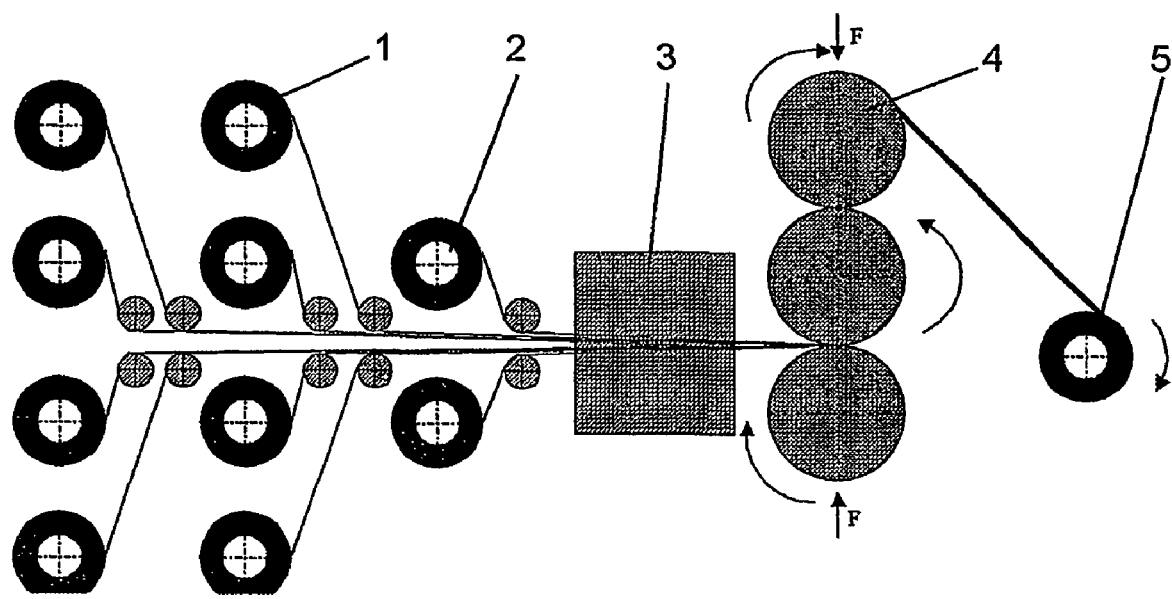
FIG. 1 shows an apparatus for fabricating flat gaskets according to the principles of the present invention.

The following description of the preferred embodiments is merely exemplary in nature and is in no way intended to limit the invention, its application, or uses.

The quasi-continuous impregnation of the nonwoven fabric with, for example, a PTFE dispersion containing 50 to 60 wt. % of PTFE, 3 to 5 wt. % of alkylphenol ethoxylate, <0.2 wt. % of ammonium pentadecafluorooctanoate and the remainder demineralized water is carried out by pulling the nonwoven fabric webs automatically through an impregnation bath at a rate of about 0.1-5 m/min. The residence time in the impregnation bath depends on the desired degree of impregnation and on the active agent used. Predominantly used for impregnation are pure aqueous PTFE dispersions or mixtures of aqueous PTFE dispersions with mineral fillers, the mixtures containing as the inorganic filler, for example, up to 50 wt. %, based on the dry weight of PTFE, of graphite, talc, mica or molybdenum sulfide and common dispersing aids. To make sure that the mixture in the impregnation bath is uniform, the mixture can be agitated, for example, with an agitator or with the aid of pumps, depending on the impregnant mixture involved. In this manner, it is ensured that the nonwoven fabric in question will be impregnated to the maximum degree of saturation (up to about 95-98% of active agent content).

In cases in which, for reasons of sealing stability, a higher proportion of fibers is desired in the finished gasket, part of the impregnant is again squeezed out from the nonwoven fabric on a downstream squeezing section 2. This is done also to achieve very good distribution of the active agent in the nonwoven fabric web. To this end, the gap between rolls is between about 50% of the starting thickness of the nonwoven fabric and the maximum prepreg thickness.

To prevent impregnant loss by dripping, the drying of the impregnated nonwoven fabric is preferably carried out in a tunnel oven at a temperature from about 30 to 300° C.

In this manner, the dispersants and other volatile impregnation materials are removed so that the impregnated nonwoven fabric finally consists exclusively of a solid, uniform fibrous structure made up exclusively of the high-quality fibers of the nonwoven fabric and the PTFE active agent combination which even before being subjected to sintering gives a chemically and mechanically very stable flat gasket. Because of the low degree of densification, such a gasket is particularly well suited for applications requiring high gasket deformation, namely a still highly flexible gasket capable of adapting, for example, to sealing sites of high surface roughness or of being used, for example, in enameled flanges or glass flanges etc.

For applications requiring higher density or gas tightness and stability of the flat gaskets used, in a subsequent fabrication step, the PTFE nonwoven fabric web is subjected to a heat and compression treatment by a continuous rolling or lamination process using rotating, internally electrically heated steel rolls. On one side, this produces marked densification of the PTFE nonwoven fabric web and at the same time, because of the squeezing action of the rolls which have a surface roughness Rz of 6 μm or less, marked surface smoothing and densification of the nonwoven fabric web takes place (smoothing or smooth squeezing and cementing of the PTFE flocks at the surface, initial sintering). This gives a smooth, gas-tight surface which is thus, among other things, also less prone to dirt accumulation.

If, while the web is passing through the rolls, the heat supply to the PTFE nonwoven fabric web is increased, for example by slowing down the rate of web travel and at the same time raising the roll pressure exerted on the PTFE nonwoven fabric, it is also possible to sinter the PTFE nonwoven fabric web almost continuously. By applying an appropriately high pressure, it is thus possible to laminate together several (preferably 2 to 10) of these PTFE nonwoven fabric webs to a nonwoven fabric structure. In this manner, for example, differently densified or thick PTFE nonwoven fabric webs or PTFE nonwoven fabric webs prepared with different PTFE impregnants can be laminated together.

In particular, the lamination unit in this case consists of PTFE nonwoven fabric webs 1 wound onto width-adjusting rollers 2 with the corresponding tensioning and breaking systems. This is followed by a preheating section 3 where a large amount of heat is supplied to the PTFE nonwoven fabric web by heating the hot-air chamber to 40-400° C.

PTFE nonwoven fabric web 1, which is to be densified and smoothed, or PTFE nonwoven fabric web 1, which is to be bonded and densified, is conveyed continuously through the calendering section by three rotating calender rolls 4, and passed three times between the calender rolls. The speed of the PTFE nonwoven fabric web is preferably between 0.1 to 2 m/min, depending on the residence time desired.

To this end, rolls 4 are heated to a temperature between 30 and 300° C.

To densify PTFE nonwoven fabric web 1, namely to apply pressure, the gap between the metallic rolls can be chosen almost at will by making use the nearly independent horizontal displaceability of the rolls. Preferably, the gap amounts to between 95% and 50% of the thickness of the undensified PTFE nonwoven fabric web 1 or to between 95% and 50% of the total thickness of several PTFE nonwoven fabric webs 1, said thickness being made up of the sum of the individual PTFE nonwoven fabric webs that are to be bonded together.

The PTFE nonwoven fabric web thus densified and heated and optionally laminated is then cooled on a cooling section and wound onto a wind-up roll.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A flat gasket comprising a sealing element including at least one layer of nonwoven fabric made of one selected from the group consisting of asbestos-free fibers and fiber blends, the nonwoven fabric being impregnated with a polytetrafluoroethylene (PTFE) dispersion; and
   wherein said PTFE dispersion includes ammonium pentadecafluorooctanoate.

2. The flat gasket according to claim 1, wherein the PTFE dispersion contains inorganic fillers.

3. The flat gasket according to claim 1, wherein the PTFE dispersion contains as inorganic filler up to 50 wt. % of at least one selected from the group consisting of graphite, talc, mica and molybdenum sulfide, based on a dry weight of PTFE.

4. The flat gasket according to claim 1, wherein the nonwoven fabric is a mechanically bonded nonwoven fabric with a fiber length from 2 to 100 mm, and a weight per unit area from 20 to 500 g/m$^2$.

5. The flat gasket according to claim 4, wherein the mechanical bonding of the nonwoven fabric is carried out by water-jet bonding or needling.

6. The flat gasket according to claim 1, wherein the nonwoven fabric comprises fibers or fiber blends of fibers selected from the group consisting of polyimide (PI), polybenzimidazole (PBI), polyester (PES), glass fibers (GF), aramide fibers (AF) and basalt fibers.

7. The flat gasket according to claim 6, wherein the fibers comprise aramide fibers.

8. The flat gasket according to claim 1, wherein the nonwoven fabric is a mechanically bonded nonwoven fabric with a fiber length from 3-20 mm.

9. A flat gasket comprising a sealing element including at least one layer of nonwoven fabric made of one selected from the group consisting of asbestos-free fibers and fiber blends, the nonwoven fabric being impregnated with a polytetrafluoroethylene (PTFE) dispersion; and
   wherein said PTFE dispersion includes alkylphenol ethoxylate.

10. The flat gasket of claim 1, wherein said PTFE dispersion includes 50-60 wt % of PTFE, 3-5 wt % of alkylphenol ethoxylate, less than 0.2 wt % ammonium pentadecafluorooctanoate, and the remainder demineralized water.

11. A flat gasket comprising a sealing element including at least one layer of nonwoven fabric made of one selected from the group consisting of asbestos-free fibers and fiber blends, the nonwoven fabric being impregnated with a polytetrafluoroethylene (PTFE) dispersion that includes 50-60 wt % of PTFE, 3-5 wt % of alkylphenol ethoxylate, less than 0.2 wt % ammonium pentadecafluorooctanoate, and the remainder demineralized water.

* * * * *